UNITED STATES PATENT OFFICE.

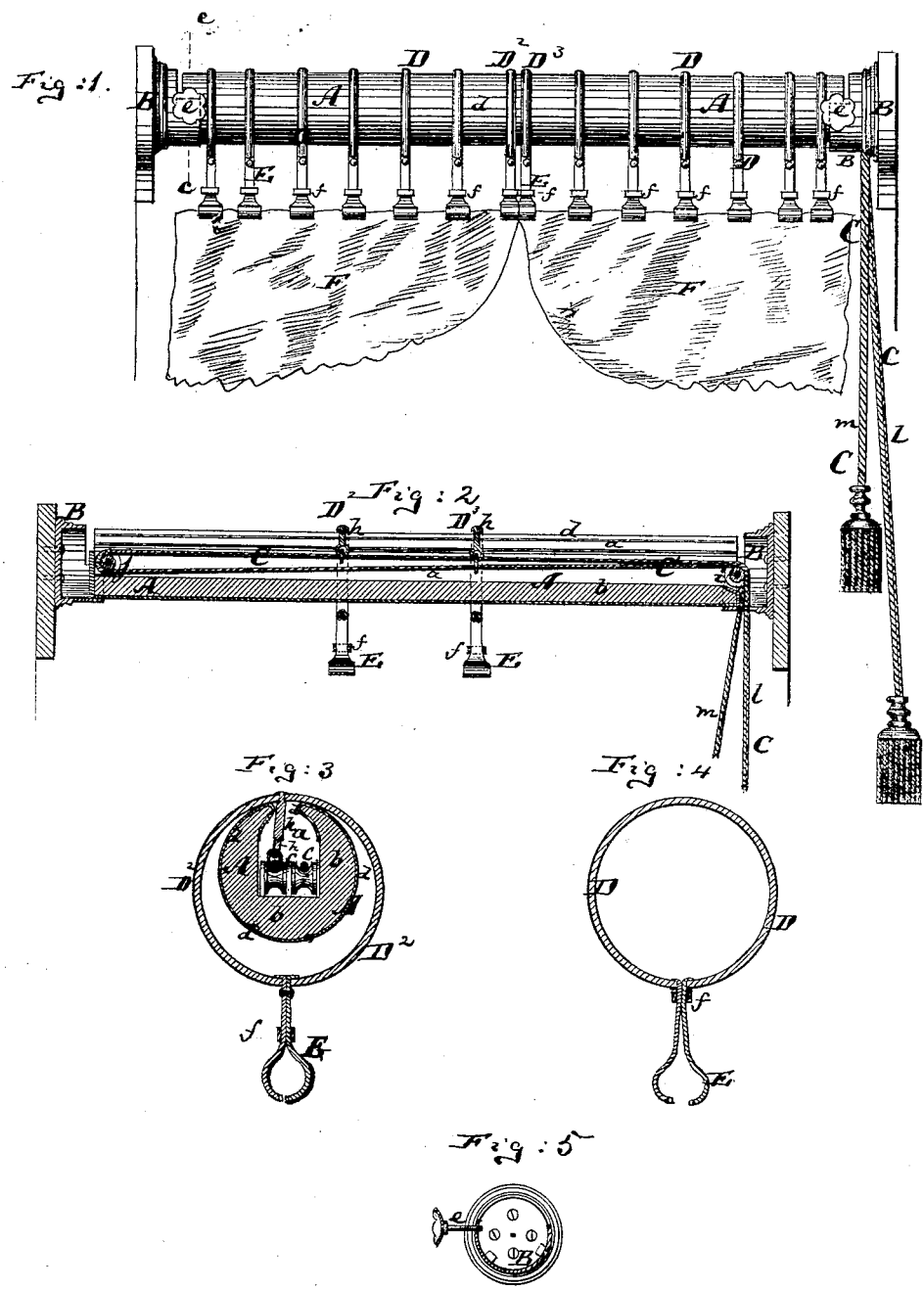

HERMANN HERLT, OF NEW YORK, N. Y.

IMPROVEMENT IN CURTAIN-FIXTURES.

Specification forming part of Letters Patent No. 203,270, dated May 7, 1878; application filed April 2, 1878.

*To all whom it may concern:*

Be it known that I, HERMANN HERLT, of New York city, county and State of New York, have invented a new and useful Improvement in Fixtures for Window-Curtains, of which the following is a specification:

Figure 1 is a face view of my improved window-curtain fixture; Fig. 2, a longitudinal section thereof; Fig. 3, a transverse section thereof, on an enlarged scale; Fig. 4, a transverse section of one of the sliding rings on the roll; and Fig. 5, a cross-section of the end bracket on the line $c\ c$, Fig. 1.

Similar letters of reference indicate corresponding parts in all the figures.

The object of this invention is to provide means for suspending window-curtains, whereby the curtains can be drawn apart or suspended in front of the windows, at pleasure, and whereby the curtains, furthermore, can be fastened without injury to their upper portions, and without much labor or effort.

The invention consists, first, in providing a series of sliding clamps for attachment to the upper part of the curtains; and, further, in connecting several of these clamps with a movable rope or cord, so that by pulling said cord the curtains can be drawn apart or together, at pleasure.

The invention also consists in a new construction of roll or bar, on which said rings slide, and in other details of improvement, which are hereinafter more fully pointed out.

In the accompanying drawing, the letter A represents what I term the "roll" or "bar" of the fixture itself, the same being of such length that it will fit between two supporting-brackets, B B, and extend across the upper part of a window.

The bar I prefer to construct, as shown in Fig. 3, of cylindrical form, with a groove, $a$, in the top. This gives opportunity for the insertion of the guide or adjusting cord or rope C into the groove $a$.

The roll A is composed of a body, $b$, of wood, which has the general outer shape of the roll, and which is hollowed on top to form the groove $a$. This wooden body is bound and incased in a sheet-metal covering, $d$, which embraces its outer sides, and laps into the upper portion of the groove $a$, as clearly shown in Fig. 3. I thus obtain a strong bar or roll capable of receiving metallic polishes and ornamentation, and yet not too heavy nor too expensive. The ends of this roll A are rigidly supported in the brackets B B, which have suitable sockets for receiving the roll, as indicated, and which may be provided with set-screws $e$, for clamping the parts together.

Around the roll are placed a series of rings, D D, which, at their lower parts, carry pendent clamps E E, as clearly shown in Figs. 1, 3, and 4, for taking hold of the upper parts of the curtains F F. Each of said clamps E consists of two claw-like pieces of sheet metal, which can be brought close together by lowering a sliding ring or loop, $f$, as in Fig. 3, or spread apart by raising said ring, as in Fig. 4; but instead of said ring, a screw or other means for closing or opening the curtains may be used.

The two central rings $D^2$ and $D^3$ are also provided with projecting rods $h$, that extend downward into the groove $a$ of the roll A, and connect within said groove with the cord or rope C. This cord or rope enters one end of the groove $a$, and passes over a suitable friction roller or pulley, $i$, as indicated in Fig. 2, and then extends within the groove $a$ to the other end of the roll A, where it passes over another friction-roller, $j$, and is then returned to the entering end of the groove and carried down again.

The projecting arm $h$ of the ring $D^2$ connects with the one or entering strand of this cord within the groove $a$, and the arm $h$ of the ring $D^3$ connects with the other strand of said cord, as indicated in Fig. 2; so that by pulling the entering end $l$ of the cord the two rings $D^2$ and $D^3$ will be brought together, while by pulling on the other end $m$ of the cord the two rings will be pulled apart. The said two rings $D^2$ and $D^3$, being joined to the inner parts of the curtains, also necessarily control the position of the curtains, for when these rings $D^2$ and $D^3$ are brought together, as in Fig. 1, the curtains are spread across the window, while when said rings are drawn toward the brackets B B the curtains will be contracted and folded out of the way.

I claim—

1. A curtain-fixture composed of a roll or bar, A, in combination with sliding rings D D, having clamps E E, substantially as herein shown and described.

2. The roll or bar A, having the groove $a$, combined with the pulleys $i\,j$, rings $D^2$ and $D^3$, having arms $h\,h$ and clamps E E, and with the cord C, substantially as herein shown and described.

HERMANN HERLT.

Witnesses:
F. v. BRIESEN,
T. B. MOSHER.